United States Patent Office 3,136,891
Patented June 9, 1964

3,136,891
MONITORING DEVICES FOR DETECTING FISSION PRODUCTS IN A GASEOUS STREAM
Jean Graftieaux, Sceaux, and René Donguy, Vanves, France, assignors to Commissariat a l'Energie Atomique, Paris, France, an organization of France
Filed May 17, 1960, Ser. No. 29,683
Claims priority, application France May 19, 1959
2 Claims. (Cl. 250—83.3)

The present invention relates to monitoring devices for detecting and measuring short-lived fission products in a gaseous stream, in particular for detecting possible can bursts in nuclear reactors (generally of the heterogeneous and gas cooled type) where the nuclear fuel elements (such as elements of uranium, either enriched or not, or of compounds or alloys thereof) are placed in gastight cans.

In the U.S. patent application Ser. No. 817,811, of June 3, 1959, filed by Jean Goupil, Jean Graftieaux and Jean Megy, now Patent No. 3,084,252, a method and a device were described for this purpose.

This method consists, after having eliminated any solid substance from the gaseous stream to be monitored, in first passing the stream through a decay zone, where the short-lived gaseous fission products of the stream decay to solid products including solid positive ions, then passing the stream, with the solid ions contained therein, through a collecting zone limited, along a portion thereof, by an area of a rotatable metallic drum and wherein an electric field having a voltage gradient directed toward said area is provided so that the positive ions are collected by said area, means being provided for rotating said drum so that said area thereof is monitored for radioactivity by a radiation detector located close to said drum.

The device described in the above mentioned prior patent application comprises a decay chamber, a metallic rotatable drum, a collecting conduit having a wall section thereof formed by a portion of the periphery of said drum, means for passing said stream successively through a filter, said decay chamber and said collecting conduit, means for producing, at least during given collecting periods, in said conduit an electric field having a voltage gradient directed toward said portion, a radiation detector located close to the periphery of said drum outside said conduit and means for bringing successive areas of said drum in position to constitute the portion of said drum forming said wall section during a collecting period, and in front of said detector during a measuring period.

In said device the electric field is preferably provided by an electrode located at the extremity of said collecting zone or conduit just opposite said area of the drum and brought, at least during the collectng periods, to a high positive potential, thereby directing the positive solid ions toward said area.

In order to take into account the radioactivity of every area of the drum before the ion collection, this previous radioactivity is advantageously determined by means of the same radiation detector just before the ion collection and it is deducted from the radioactivity of said area after the ion collection.

A very accurate and selective determination of the radioactivity of only the short-lived fission products is thus obtained, thereby making it possible to monitor in a very accurate manner the variations in course of time of the relative quantity of fission products emitted in the monitored stream, e.g. by a leak in the jacket surrounding the nuclear fuel slugs.

The object of the present invention is to improve the accuracy and selectivity of radioactive measurements.

For this purpose, the volume left free around the drum is reduced as much as possible so that measurements cannot be disturbed by the parasitic radioactivity in this free volume.

Furthermore, the conduit through which flows the gaseous stream to be studied is separated from the remainder of the device so that no portion of the gaseous stream can reach the parts which control the positioning and operation of the drum. Thus, these parts (a complete description of which is given in the above mentioned prior patent application) are protected against deterioration while being accessible for adjustment and repair, if necessary, without any danger of soiling the atmosphere.

Therefore, the device according to this invention, which is of the type described in the above mentioned prior patent application and includes a metallic drum rotatable about a fixed axis so as to bring successive areas thereof first into a collection position in which the radioactive ions resulting from radioactive decay of the short-lived fission products in the gaseous stream are collected thereby and subsequently into a measuring position in which the radioactivtiy of these areas is measured by means of a nuclear radiation detector, is characterized in that said drum is housed in a cavity provided in a metallic casing wherein said drum fits closely and by the fact that said drum is rotated about its axis by a magnetic coupling or driving mechanism acting through a gastight partition belonging to said casing.

Such an arrangement has the following advantages: the volume of residual gas, contained in the casing surrounding the drum and influencing the sensitive element of the radiation detector, is minimized, thereby considerably reducing the background noise due to the radioactivity of this gas; the oxidizable or delicate parts of the drum driving motor, of the gears provided between the motor shaft and the drum shaft and of the micro-switch or similar element ending the drive when the drum reaches the desired position (in particular the parts of said motor, gears and micro-switch which are especially sensitive to the action of the reactor coolant gas, such as radioactivated carbon dioxide under pressure, to wit copper wires, metallic plates of the motor, varnishes, insulating material, gear lubricating oil) are protected against the action of this gas and of the radioactive products that may be contained therein; the means for driving and positioning the drum are more readily accessible thereby allowing easier adjustment or repair; in particular, these operations may be performed without having to isolate the conduit portion (for the gaseous stream) between the drum and the detector.

A preferred embodiment of the present invention will be hereinafter described with reference to the appended drawings given merely by way of example and in which.

Figure 1:
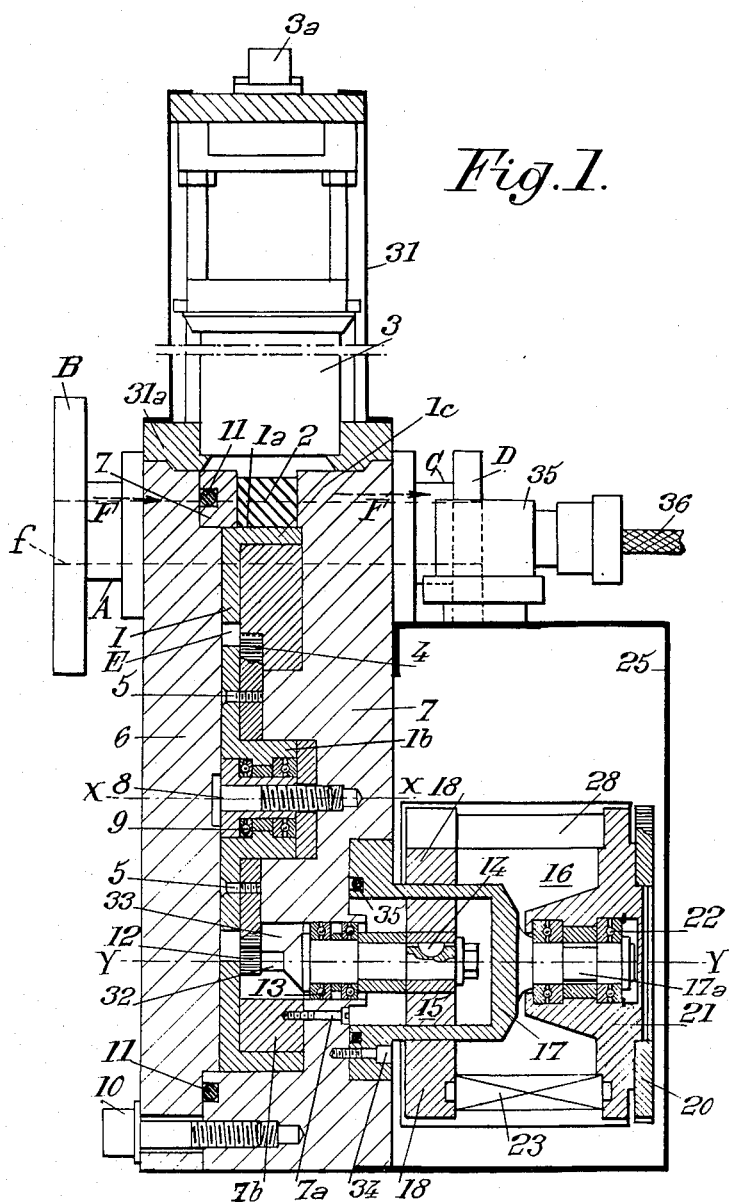
FIG. 1 is an elevation view, partly in section along I—I of FIG. 2, of a device according to the present invention.

Referring chiefly to FIG. 1 (which, like FIG. 2 of the above mentioned prior patent application, is a section along a diametral plane of the drum, passing through the radioactivity detector which cooperates therewith) it will be seen that metallic drum 1, made for instance of stainless steel or of an aluminum alloy (in particular an alloy containing 5% of copper) is mounted for rotation about its axis X—X so that successive areas of the peripheral surface 1a of the bent edge 1c of the drum may be brought: on the one hand opposite an electrode brought to a positive potential of about 1,000 volts by means of a conductor 30 (FIG. 2) so as to repel the positive radioactive solid ions present in the gaseous stream to be monitored for radioactivity (which enters through conduit A provided at its end with a fixation flange B, passes along the peripheral surface 1a of drum 1 as shown by arrows F through duct f and flows out through conduit C provided at its end with a fixation flange D) against the area of the peripheral surface 1a that is located opposite said electrode 29, these ions being adsorbed by this area, and on the other hand opposite a nuclear radiation detector, which is preferably of the scintillation type and comprises in this case, in the known manner, a scintillator element 2, a photomultiplier 3 and an electronic system, not shown and connected at 3a to the output of the photomultiplier tube.

Figure 2:
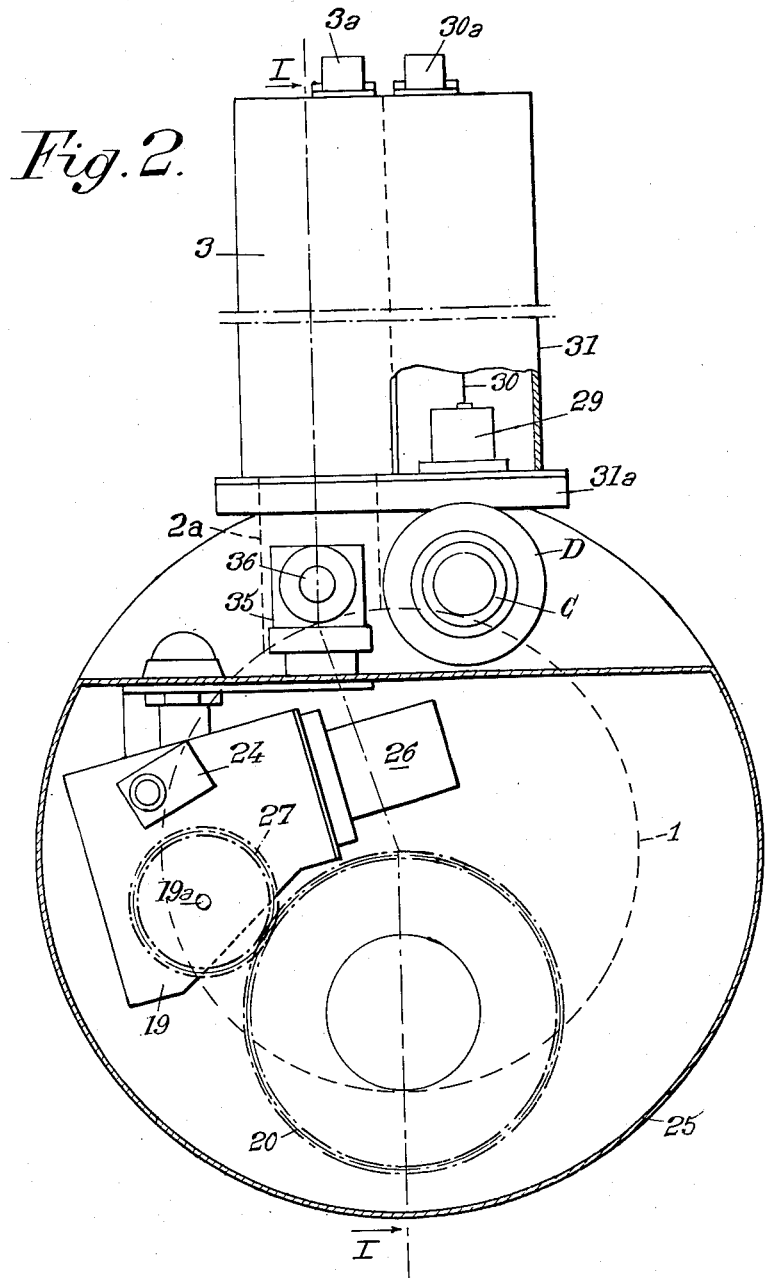
FIG. 2 is a side view (from the right end side) of the device of FIG. 1.

Drum 1, together with a toothed wheel 4 secured thereto by means e.g. of screws 5 is housed in a cavity E provided between two metallic blocks 6 and 7, for instance made of an aluminum allow containing about 4% of copper and designated by the trademark name "Duralumin," the dimensions of cavity E being just slightly greater than those of drum 1 and of its toothed wheel 4, so that the drum fits closely between the two blocks 6 and 7, without any substantial residual volume between these blocks and the drum, especially in front of scintillator element 2 (as shown on FIG. 2). This scintillator element is located in a peripheral internal cavity 2a provided in block 7. Photomultiplier 3 and electrode 29, together with its conductor 30 which receives high voltage current through input 30a, are housed in a casing 31 carried by a support 31a secured on one side of blocks 6 and 7 in a gastight fashion (FIGS. 1 and 2).

Drum 1 is applied against block 6 by a screw 8 housed in this block and carrying a ball bearing 9 coaxial, about axis X—X, with the hub 1b of drum 1. Screws 10 fix, in a detachable manner, blocks 6 and 7 to each other, block 7 carrying, through screws 7a, a kind of ring 7b located inside the bent edge 1c of the drum. Gastightness between these blocks is ensured by means of at least one toroidal packing member 11 to prevent the passage of the radioactive gas passing through duct f from A to C in the direction of the dotted line arrows F behind the section plane of FIG. 1 (this section plane being shown by line I—I on FIG. 2).

Toothed wheel 4 is driven by a pinion 12 having a number of teeth much smaller than that of wheel 4 so as to obtain a speed reduction which improves the accuracy of positioning of drum 1 every time it is stopped. This pinion is carried by a shaft 32 rotatable about an axis Y—Y in a ball bearing 13 placed in a housing 33 extending from the outside into cavity E.

This shaft 32 carries, fixed thereon by feather keys 14, pole pieces 15 driven by an external magnetic coupling or driving mechanism 16, which acts through a bell-shaped partition or cover 17 made of a non magnetic material. This bell-shaped cover 17 is fixed on block 7 by screws 34 in a detachable manner, gastightness between the inside of cover 17 and the external atmosphere being obtained by means of a toroidal packing member 35.

The pole pieces 15 (fixed on shaft 32) are rotated through the wall of bell-shaped cover 17 by a system of pole pieces 18 and magnets 28 located around said cover. Magnets 28 are fixed through members 23 to a piece 21 rotatable on ball bearing 22 about axis Y—Y, this piece 21 being carried by an extension 17a of cover 17 and being rigid with a toothed wheel 20 meshing with a pinion 27 fixed on the shaft 19a of electric motor 19 which serves to drive drum 1. A micro-switch 24 is actuated every time the shaft 19a of motor 19 occupies a given position and it acts upon a relay 26 (FIG. 2) for stopping motor 19 (by means of a brake mounted on a rotor and not visible on the drawings) when the drum occupies the desired position according to a predetermined program comprising essentially bringing successive areas of the periphery 1a of drum 1 first opposite the electrode 29 for adsorbing the solid ions present in the gaseous flow through duct f, then opposite the scintillator element 2 for determining the radioactivity of the adsorbed ions. An example of a convenient program and of the means for automatically performing such a program are given in the above mentioned prior patent application. In particular a taring operation, consisting in determining the residual radioactivity of each peripheral area of the drum before ion collection, may be provided.

The whole of motor 19, micro-switch 24, relay 26 and magnetic coupling mechanism 16 is housed in a casing 25 (FIGS. 1 and 2) which can be easily detached for inspection and repair. This casing carries a connection box 35 for the conductor 36 through which current is fed to motor 19, micro-switch 24 and relay 26.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for determining the quantity or positively-charged, radioactive, solid ions in a gaseous stream, comprising in combination, a metallic casing formed by a first and a second metallic block secured together in a detachable manner, with a gastight packing member interposed between said first and said second block, so as to limit between said first and said second block a cavity of revolution around an axis, said cavity having in section substantially the shape of an E, a bose traversing said first block and communicating therefore with said cavity, a cover having the shape of a bell with a peripheral flange, said flange being secured in a detachable manner to said first block around said bore so that said bell closes said bore, a gastight packing member between said flange and said first block, a metallic drum mounted in said casing for rotation around said axis, said drum comprising an axial cylindrical hub and a peripheral flange and having therefore in section substantially the shape of an E, the E-shape of said drum being substantially the same as the E-shape of said cavity so that said drum fits closely for rotation in said cavity, a passage provided in the periphery of said casing and adapted to be traversed by said gaseous stream, said passage communicating with said cavity for passing said gaseous stream along a portion of said peripheral flange, means for producing in said passage an electrostatic field directing positively-charged ions traversing said passage towards said portion of said flange, a radioactivity detector carried by said casing on the periphery of said cavity, and driving means for rotating said drum so as to bring, according to a predetermined program, successive areas of the peripheral flange of said drum in front of said passage to constitute said portion towards which are directed positively charged ions traversing said passage and then in front of said detector, said driving means being formed by a shaft with a first portion housed in said bore and a second portion housed in said cover, by a driving mechanism located on the outside of said cover and journalled thereon in line with said shaft, by means for rotating said driving mechanism according to said program, by a ring of magnets carried by said mechanism for rotation around said cover, by a ring of pole pieces carried by said second portion of said shaft inside said cover in regard to said magnets and by transmission means transmitting the rotation of said shaft to said drum.

2. A device according to claim 1, in which said bore is parallel to said axis, said shaft is journalled in said bore parallel to said axis, and said transmission means comprise a toothed wheel rigidly secured to said hub of said drum and a pinion rigidly secured on said first portion of said shaft and in mesh with said toothed wheel.

(References on following page)

References Cited in the file of this patent

UNITED STATES PATENTS

| | | |
|---|---|---|
| 2,576,616 | Livingston et al. | Nov. 27 1951 |
| 2,826,076 | Boreitz | Mar. 11, 1958 |
| 2,916,626 | Thomas et al. | Dec. 8, 1959 |
| 2,953,687 | Bergstedt | Sept. 20, 1960 |

FOREIGN PATENTS

| | | |
|---|---|---|
| 1,177,604 | France | Apr. 28, 1959 |

OTHER REFERENCES

Automatic Sample Changer for Well-Type Scintillation Counter, by Demorest et al., Nucleonics, vol. 12, No. 7, July 1954, pages 68 and 69.

A Continuous Monitor for Airborne Plutonium by Collins, DP 188, November 1956.

An Alpha Monitor for Waste Streams by Wingfield, DP 197, January 1957.

Continuous Air Monitors for H3 by Bringerhoff et al., Nucleonics, vol. 17, No. 2, February 1959, pages 76, 78 and 81.